United States Patent [19]

Schieferly

[11] Patent Number: 4,880,392
[45] Date of Patent: Nov. 14, 1989

[54] SLIDELATCH SECURING POST

[76] Inventor: Stephen B. Schieferly, B-11 326 Lopax Rd., Harrisburg, Pa. 17112

[21] Appl. No.: 315,178

[22] Filed: Feb. 24, 1989

Related U.S. Application Data

[63] Continuation of Ser. No. 134,673, Dec. 18, 1987, abandoned.

[51] Int. Cl.$^4$ .............................................. H01R 4/50
[52] U.S. Cl. ..................................................... 439/347
[58] Field of Search ................ 439/347, 564, 561–563, 439/573; 411/452, 500–507

[56] References Cited

U.S. PATENT DOCUMENTS

| | | | |
|---|---|---|---|
| 2,146,461 | 2/1939 | Bettington | 411/501 |
| 2,302,501 | 11/1942 | Mears | 411/501 |
| 2,820,209 | 1/1958 | Whitted | 411/452 |
| 4,127,627 | 10/1979 | Ricros | 339/75 |
| 4,367,003 | 1/1983 | Frantz | 339/91 |
| 4,568,135 | 2/1986 | Frantz | 339/91 |

OTHER PUBLICATIONS pp. 88 & 89 AMP Catalog, 79-546 pub. Dec. 1984.
AMP Incorporated Instruction Sheet US 6551, Released 07/30/82.
Cover Sheet and pp. 44 & 45 AMP Catalog 79-547, published Dec. 1980.
Catalog #50, 1946, John Hassall, Inc.

*Primary Examiner*—David Pirlot
*Attorney, Agent, or Firm*—David L. Smith

[57] ABSTRACT

A connector assembly (16) having a dielectric housing (20) with contacts (27,29) secured in contact receiving passages (26) has a flange (32) extending from the housing (20). The flange (32) has a pair of spaced apertures (46,48) for securing the connector assembly (16) to a complementary or mating connector assembly (14). A latching member (50) having an aperture (70) to receive housing (20) has slots (74,76) coextensive with apertures (46,48) is received in engagement with flange (30). Received in a flange aperture (46,48) and latching member 50 slot 74,76 is a slidelatch securing post (56,58) having first shoulder (78) spaced from and facing the flange (32), a second shoulder (96) facing the flange (30), and engaging the flange (32) so as to position the first shoulder (78) a predetermined distance from the flange (32), and a shank (92) extending into the aperture (46,48) and rolled to secure the slidelatch securing post (52,54) to the flange (32). Latching member (50) is slidably secured to connector assembly (16) between first shoulder (78) and flange (30) with sliding movement also constrained by slots (74,76).

6 Claims, 3 Drawing Sheets

SLIDELATCH SECURING POST

This application is a continuation of application Ser. No. 134,673 filed Dec. 18, 1987, now abandoned.

BACKGROUND OF THE INVENTION

This invention relates to a latching mechanism for securing electrical connectors in a mated condition and in particular to a connector assembly including a rollable or otherwise easily attached slidelatch securing post.

Slidelatches for securing two connectors together are disclosed in U.S. Pat. Nos. 4,367,003 and 4,568,135. The securing posts used in these slidelatches are machined parts having threaded shanks that require nuts and washers to be secured to a connector. While these securing posts are satisfactory in operation, they are expensive to manufacture and install.

SUMMARY OF THE INVENTION

In accordance with the present invention, a connector assembly having a dielectric housing with contact receiving passages therein having contacts secured therein has a flange extending from the housing. The flange has a pair of spaced apertures for securing the connector assembly to a complementary or mating connector assembly, a latching member having an aperture to receive the dielectric housing has slots coextensive with the spaced apertures is positioned adjacent the flange. Received in a flange aperture and latching member slot is a slidelatch securing post having a first shoulder spaced from and facing the flange, a second shoulder facing the flange, and engaging the flange so as to position the first shoulder a predetermined distance from the flange, and a shank extending into the aperture and rolled to secure the slidelatch securing post to the flange. The latching member is thus slidingly secured to the connector assembly between the first shoulder of the slidelatch securing post and the flange with sliding movement constrained by the slots.

DESCRIPTION OF THE PREFERRED EMBODIMENT

Figure 1:
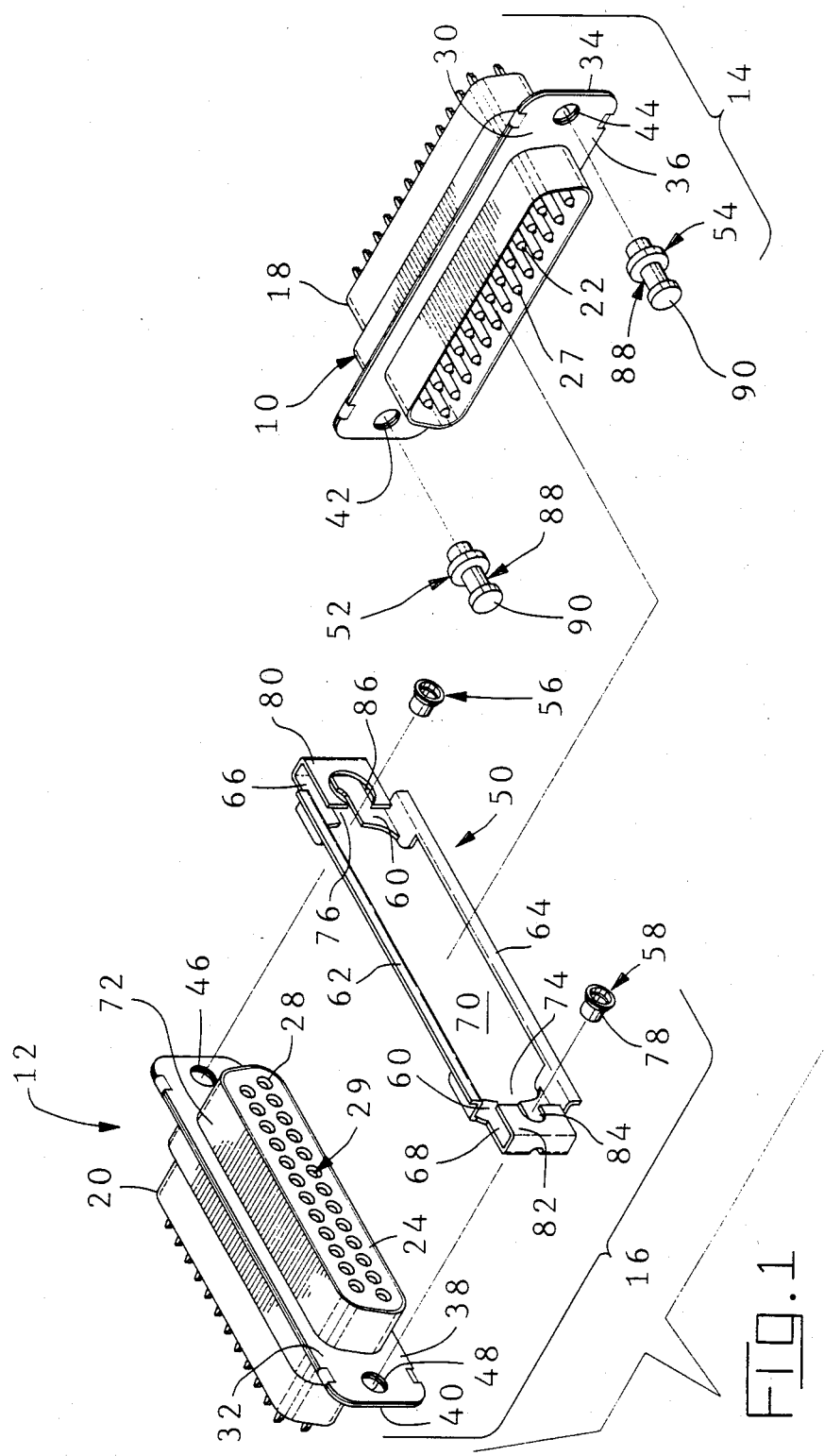
FIG. 1 is an exploded perspective view of a pair of complementary matable connectors having a latching system incorporating the present invention.
Figure 2:
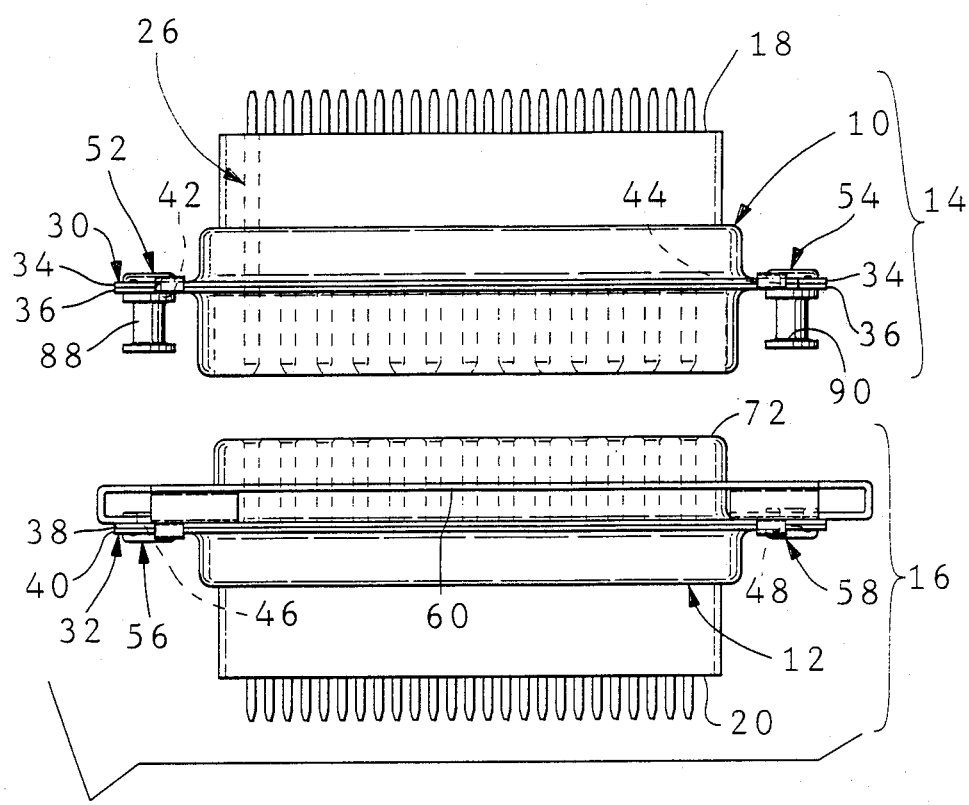
FIG. 2 is a side elevation, partly in section, of the complementary connectors and latching system in an unmated and unlatched condition.
Figure 3:
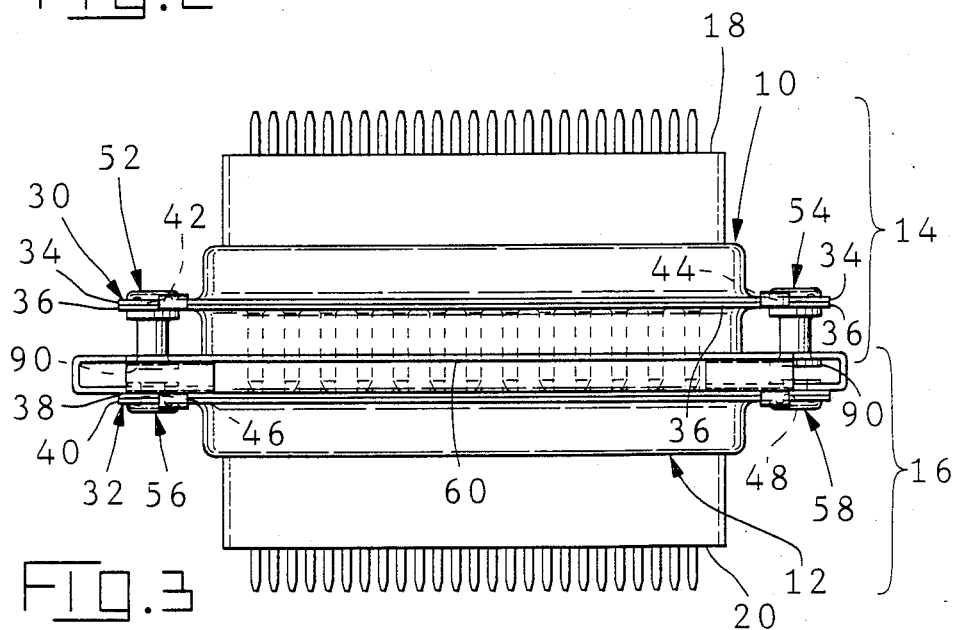
FIG. 3 is a side elevation, partly in section, of the complementary connectors and latching system in a mated and latched condition.

A slidelatch system has been shown in FIGS. 1-3 including a pair of known matable connectors. The connectors may be of the type shown in U.S. Pat. Nos. 3,101,229, 3,879,099 or 4,062,616, the disclosures of which are hereby incorporated by reference. Mateable connectors 10 and 12 are each a part of a connector assembly, respectively, 14 and 16. Connector 10 is a plug member and connector 12 is a receptacle member. The securing post employed in slidelatch system disclosed herein is an improvement over the securing post employed in slidelatch system disclosed in U.S. Pat. Nos. 4,367,003 and 4,568,135, the disclosures of which are hereby incorporated by reference.

Connectors 10 and 12 each include housings 18,20 molded of an insulative thermoplastic material having a mating face 22,24 having a plurality of contact receiving passages 26,28 extending rearward therefrom having pins 27 and sockets 29, respectively secured therein. Pins 27 and sockets 29 are individually or collectively referred to as contacts. Each mateable connector 10,12 has an integral flange 30,32 either in housing 18,20 or as shown in the preferred embodiment in a two piece metal shell 34,36 and 38,40 enclosing and shielding the housing 18,20 in the region of the contacts. Each flange 30,32 has a pair of spaced apertures 42,44,46,48 near the ends of the flange.

The slidelatch system includes an elongate rigid latching member 50, a pair of slidelatch locking posts 52,54 received in apertures 42,44 of connector 10 and a pair of slidelatch securing posts 56,58 received in apertures 46,48 of connector 12. Latching member 50 has a generally channel shape formed by base 60 and a pair of integral parallel spaced side rails 62,64 joined at the ends by transverse portions 66,68. Profiled opening 70 is generally similar in shape to shroud 72 and accommodate shroud 72 as latching member 50 moves laterally between a latched position and an unlatched position. Slots 74,76 in transverse portions 66,68 of base 60 are at least coextensive with apertures 46,48 and accommodate slidelatch securing posts 56,58 which slidingly secure latching member 50 to connector assembly 16. Slots 74,76 may be an extension of profiled opening 70, are of sufficient length to permit lateral movement of latching member 50 between a latched position and an unlatched position, and are constrained to slide along metal shell 38 between a shoulder 78 on slidelatch securing posts 56,58 and metal shell 38.

At each end of latching member 50 overturned extensions 80,82 extend from transverse portions 66,68 and lie substantially parallel thereto. Slots 84,86 in overturned extensions 80,82 overlie slots 74,76 respectively in parallel spaced relationships. Slots 84,86 are sized and spaced to engage in channel 88 of slidelatch locking posts 52,54. Slot 84 is a substantially straight slot while slot 86 has a narrow open neck extending into an enlarged opening adequate in size and shape to accommodate the retention head 90 of slidelatch locking post 52.

The operation of the latching system is best understood with reference to FIGS. 2 and 3. FIG. 2 shows connectors 10 and 12 and the slidelatch system in an unmated, unlatched position. Latching member 50 is moved laterally, to the right in FIG. 2, and positioned to allow retention head 90 of slidelatch locking post 54 to move past extension 82 and to allow retention head 90 of slidelatch locking post 52 to enter slot 86 as connectors 10 and 12 are mated. Latching member 50 is then moved laterally, to the left in FIG. 2, to position slot 84 in channel 88 of slidelatch locking post 54 as well as to position slot 86, and more specifically the narrow open neck of slot 86, in channel 88 of slidelatch locking post 52, thus securing the slidelatch in a latched position latching mated connectors 10,12 together.

Figure 4:
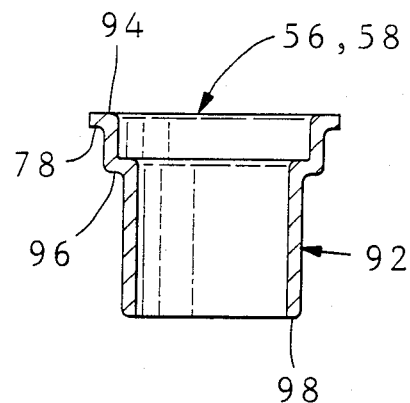
FIG. 4 is a side section view of a drawn, rollable slidelatch securing post.
Figure 5:
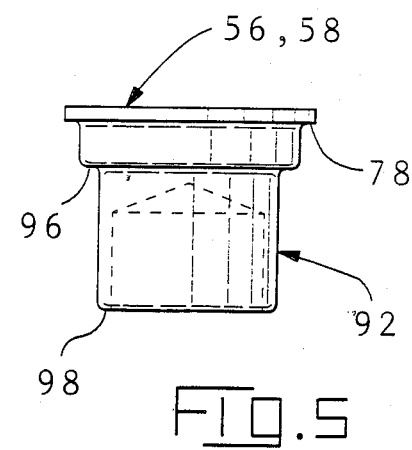
FIG. 5 is a side view of an alternate embodiment rollable slidelatch securing post.

In a preferred embodiment, slidelatch securing post 56,58 is drawn and has a rollable shank 92. A cross section of a drawn slidelatch securing post 56,58 is shown in FIG. 4. An alternate embodiment slidelatch securing post 56,58 is shown in FIG. 5. In the alternate embodiment, slidelatch securing post 56,58 is machined and has a rollable shank 92.

Figure 7:
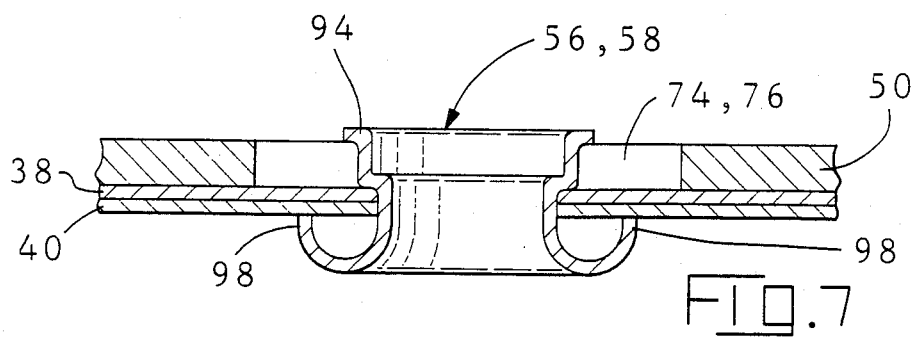
FIG. 7 is a slidelatch securing post secured in an aperture of a connector flange.

Slidelatch securing posts 56,58 slidingly secure latching member 50 to connector assembly 16. Slidelatch securing posts 56,58 have a shank 92 sized to be received in apertures 46,48 in flanges 38,40 of connector assembly 16. As best seen in FIG. 7, slidelatch securing posts 56,58 have a flange 94 which defines first shoulder 78 and an offset in diameter which defines second shoulder 96. First shoulder 78 is spaced from and faces flanges 38. With a slidelatch securing post 56,58 received in a slot 74,76 and aperture 46,48, shank 92 passes through the aperture and slot and second shoulder 96 faces and engages the surface of flange 38 to position first shoulder 78 a predetermined distance from the surface of flange 38. In this position, free end 98 of shank 92 extends beyond flange 40. First shoulder 78 is thus spaced from second shoulder 96 axially along slidelatch securing post 56,58 substantially the thickness of latching member 50 plus a tolerance.

Figure 6:
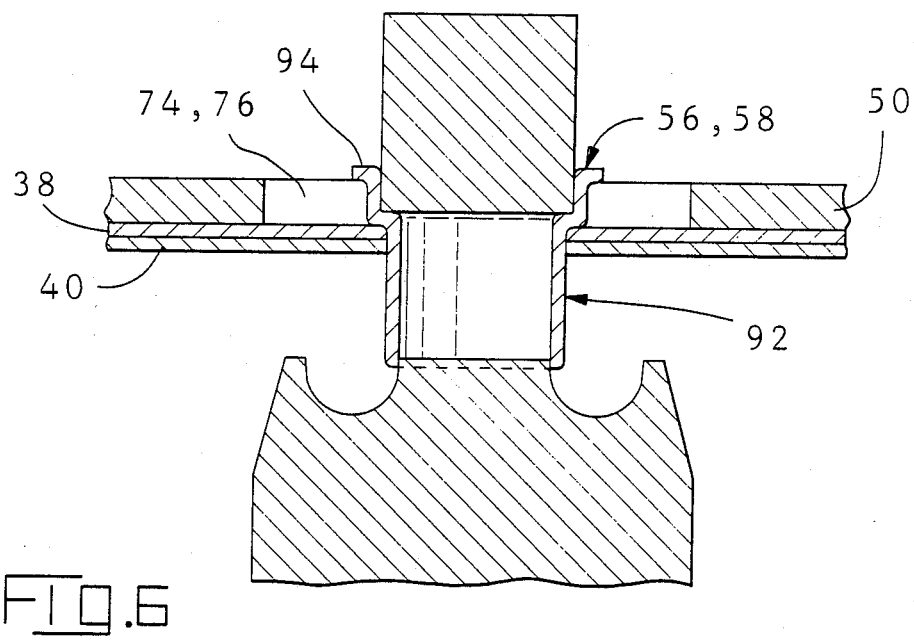
FIG. 6 is a side view, partly in section, of a rollable slidelatch securing post positioned in tooling for rolling.

Tooling for rolling shank 98 of slidelatch securing posts 56,58 is shown in FIG. 6. The tooling may be used in a known press or may be designed to be struck by a hammer to effect rolling shank 98 to secure slidelatch securing posts 56,58 to connector assembly 14.

With shank 92 rolled, slidelatch securing posts 56,58 are secured to connector assembly 16 as flanges 38,40 are sandwiched between free end 98 of shank 92 and second shoulder 96. Latching member 50 is slideable within slots 74,76 transverse to the axis of slidelatch securing posts 56,58 but constrained from moving in the axial direction due to the constraint imposed by first shoulder 78.

I claim:

1. An electrical connector assembly comprising:
a dielectric housing having contact receiving passages therein, said contact receiving passages having contacts secured therein;
flange means extending from said housing, said flange means having a pair of spaced apertures therein;
a latching member proximate the flange means, said latching member having an aperture to receive said housing and a pair of slots, at least coextensive with the spaced apertures in said flange means;
a securing post received in at least one of said coextensive apertures and slots, said securing post having
a first shoulder spaced from and facing said flange means, said first shoulder engaging the latching member proximate said slots;
a second shoulder facing said flange means, said second shoulder engaging said flange means so as to position said first shoulder a predetermined distance from said flange means; and
shank means having a free end extending into said at least one coextensive aperture and slot, the free end of said shank means rolled to secure said securing post to said flange means between said second shoulder and the rolled free end while slidingly securing said latching member to said housing between said first shoulder and said flange, whereby the latching member is slidingly secured to the electrical connector assembly.

2. An electrical connector assembly as recited in claim 1 wherein the securing post is drawn.

3. An electrical connector assembly as recited in claim 1 wherein the securing post is machined.

4. An electrical connector assembly as recited in claim 1 wherein the predetermined distance between the first shoulder and the flange means is substantially the thickness of the latching member proximate the slots.

5. An electrical connector assembly as recited in claim 1 further comprising a like securing post received in a second of said coextensive apertures and slots.

6. An electrical connector assembly, comprising:
a first dielectric housing having contact receiving passages therein, said contact receiving passages having contact means secured therein;
flange means extending from said first housing, said flange means having a pair of spaced aperture means therein;
a locking post received in at least one of said aperture means, said locking post having
a first shoulder means spaced from and facing said flange means;
a second shoulder means facing said flange means; and
shank means extending into said at least one aperture means, said shank means having means for securing said locking post to said flange means;
a second dielectric housing having contact receiving passages therein, said contact receiving passages having contacts secured therein;
a flange extending from said second housing, said flange having a pair of spaced apertures therein;
a latching member proximate the flange means, said latching member having an aperture to receive said second housing, said latching member having a pair of slots at least coextensive with the spaced apertures in said flange means, said latching member defining a thickness proximate said slots and having a member extending to engage said first shoulder means of said locking post to secure said latching member to said locking post;
a securing post received in at least one of said spaced apertures and a respective at least one of said slots, said securing post having
a first shoulder spaced from and facing said flange, said first shoulder engaging the latching member proximate said slots;
a second shoulder facing said flange, said second shoulder engaging said flange so as to position said first shoulder a predetermined distance, substantially said thickness of said latching member, from said flange; and
a shank having a free end extending into said at least one spaced aperture and respective slot, the free end of said shank rolled to firmly secure said securing post to said flange between said second shoulder and the rolled free end while slidingly securing said latching member to said housing between said first shoulder and said flange;
whereby with the latching member positioned laterally on said second housing to a first end position of travel of the latching member, the first and second housings are mated and thereafter the latching member moved along the flange away from the end of the travel position such that a member on the latching member engages the first shoulder means of the locking post to secure the first and second housings together.

* * * * *